L. SCOTT.
Grinding Mill.
No. 316.
Reissued July 10, 1855.
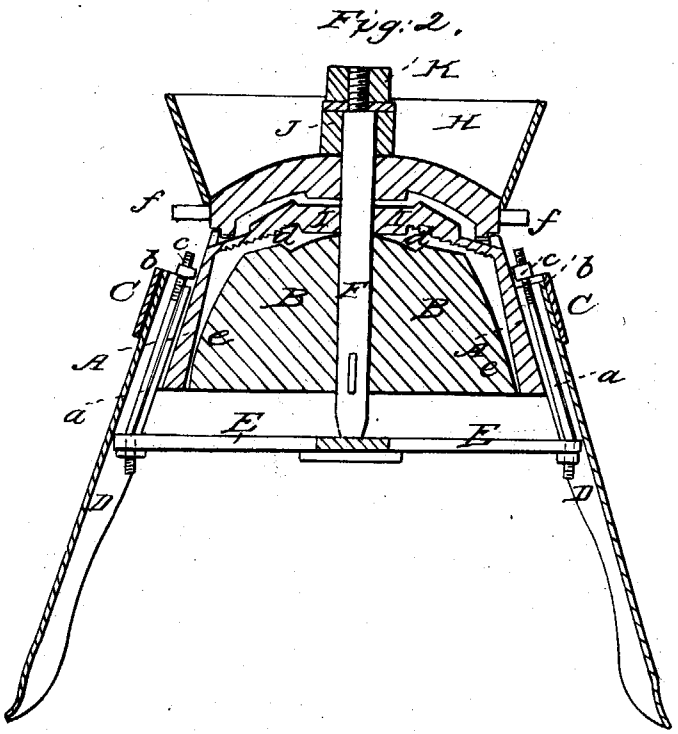
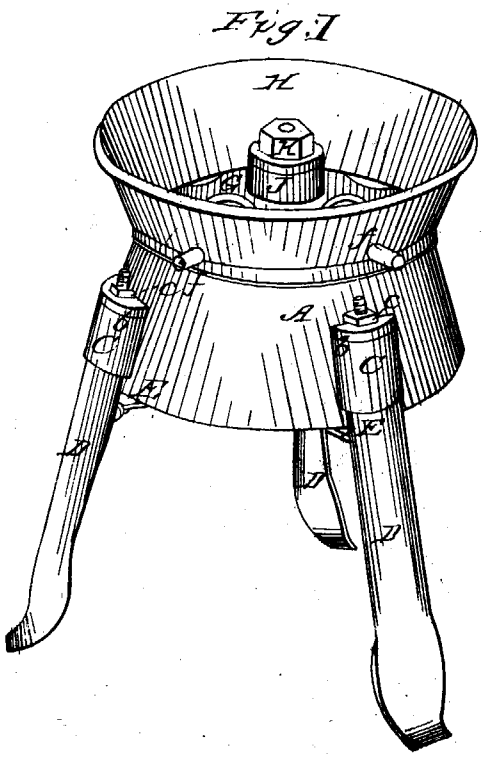
N. PETERS, Photo-Lithographer, Washington, D. C.

UNITED STATES PATENT OFFICE.

LYMAN SCOTT, OF PHILADELPHIA, PENNSYLVANIA.

IMPROVED PORTABLE GRINDING-MILL.

Specification forming part of Letters Patent No. 10,931, dated May 16, 1854; Reissue No. 316, dated July 10, 1855.

*To all whom it may concern:*

Be it known that I, LYMAN SCOTT, of the city and county of St. Louis and State of Missouri, have invented certain new and useful Improvements in Portable Mills for Grinding Grain, &c.; and I do hereby declare the following to be a full, clear, and exact description of the same, reference being had to the accompanying drawings, in which—

Figure 1 represents a perspective of the mill. Fig. 2 represents a vertical section through the same.

The nature of my improvement consists in spreading the points where the fine grinding is done by the alternate shallow and deep sections on the burr, for the purpose of preventing a surfeit or clogging of the grain at any one point; also, in the method of supporting the shell and adjusting the burr therein.

It further consists in such an arrangement or order of the operations that they may be performed successively—that is, the ears of corn are first broken, then cracked and shelled, the cob being reduced to small portions and afterward ground to meal, all of these operations being performed by distinct portions of the mill, yet acting in concert or unison with each other.

To enable others skilled to make and use my invention, I will proceed to describe the same with reference to the drawings.

A represents the shell, which is ribbed with suitable projections or teeth performing the office of corn-crackers, while its side or periphery has ribs corresponding with those on the shell A, whose office is the grinding of the grain previously reduced by breaking and cracking.

E is a bridge-tree, with a slot to receive the foot of a spindle or shaft, united with and passing through the burr. Near the top of the spindle is placed a driver, G, attached thereto by a slot and feather. This driver performs the service of a distributer or regulator, as well as that of a breaker. It is formed with two, three, or more arms extending from a central hub to the hopper H. On their outer ends are projecting teeth, which remove any lodged corn or cob.

I is a second set of stationary arms, formed like G. This set of arms serves as the upper bridge-tree, by being united to the shell A, and have projecting teeth upon the lower side. It is upon the stationary arms I that the cob is broken and the corn shelled, while by the projections from the under side of I and the teeth or projections upon the rotating burr B the broken cob is further reduced, and the corn shelled for the after grinding by the ribs on the periphery of the burr and shell. It will be borne in mind that there are three successive operations performed—viz.: first, the breaking of the ears of corn and removal of lodged corn by G; second, the cracking of the broken ears and shelling of the same by the teeth on I and on the teeth on burr A; thirdly, the grinding of the prepared and cracked cob and shelled corn by the ribs of the burr and concave or shell.

The driver G has the effect of loosening and shaking or working down the material toward the grinding-surfaces. The corn, either on the cob or shelled, or other material, is thrown into the hopper H in bulk, when, by turning the burr, &c., it is reduced to meal.

In mills with conical burrs and shell, as heretofore constructed, there is a point or line where the fine meal is first made. This line extends in a plane all around the burr, or at a uniform distance below the top of the burr. The difficulty in practice with such an arrangement is that the material surfeits or dogs at that line, it being first checked there by the proximity of the burr and shell. To avoid this evil, I make on the burr alternate sections of deep and shallow grooves, breaking the general outline of the burr, as seen at *e e*, Fig. 2, and thus cause the meal-making point to be scattered over more of the surface of the burr, and entirely prevent the evil incident to machines otherwise constructed.

The mill may be driven by levers or arms attached to the projections *f f*, which are secured to the driver; or the projections may be removed and the mill run by a belt passing around the driver.

I thus construct a very cheap and effective portable mill, which carries its supporting, adjusting, and driving parts with it, and may be worked wherever it is set down without adding anything to it except the power to drive it, which may be by horse, water, or any other power. J is a washer, and K a nut on top of the spindle, the washer running with the spindle, on which it fits by a feather and groove. By these the burr may be raised or lowered to make the permanent adjustment of the burr to the shell, so as to grind very fine or coarse, even to the shelling of the grain from the cobs, if desired.

Having thus fully described my invention, what I claim therein as new, and desire to secure by Letters Patent, is—

1. The alternate deep and shallow sections of furrows upon the main grinding-surface of the burr, for the purpose of distributing the material over said surface and preventing a surfeit or clogging upon any one point of said grinding-surface, substantially as described.

2. The method of supporting the shell and adjusting the burr therein by means of the lower bridge-tree, grooved legs, sockets, and adjusting screw-rods, when said legs serve the double purpose of supports to the shell and guides to the bridge-tree, as described.

3. The arrangement of driver G, arms I, burr B, and shell A, constructed as herein shown and described, so that the several operations of breaking the ear, cracking the cob, and grinding into meal may be all conducted without straining the mill or power applied, substantially as described.

In testimony whereof I have hereunto signed my name before two subscribing witnesses.

LYMAN SCOTT.

Witnesses:
W. S. CLARK,
JOHN F. CLARK.